United States Patent [19]

Muller

[11] 4,079,052
[45] Mar. 14, 1978

[54] DIAZOPIGMENTS CONTAINING PYRIDINE DERIVATIVES

[75] Inventor: Willy Muller, Riehen, Switzerland

[73] Assignee: Ciba-Geigy Corporation, Ardsley, N.Y.

[21] Appl. No.: 612,592

[22] Filed: Sep. 12, 1975

[30] Foreign Application Priority Data

Sep. 26, 1974 Switzerland .................. 13036/74

[51] Int. Cl.² ................. C09B 33/12; C09B 43/12
[52] U.S. Cl. .................................... 260/156; 260/140; 260/155; 260/208; 260/294.8 B; 260/295.5 T; 260/296 H; 106/288 Q
[58] Field of Search ........................ 260/156

[56] References Cited

U.S. PATENT DOCUMENTS

3,759,894  9/1973  Angliker et al. .............. 260/156 X

FOREIGN PATENT DOCUMENTS

2,023,295  11/1971  Germany ........................ 260/156
1,285,339   8/1972  United Kingdom ............ 260/156

Primary Examiner—Charles F. Warren
Attorney, Agent, or Firm—Vincent J. Cavalieri

[57] ABSTRACT

Diazopigments of the formula

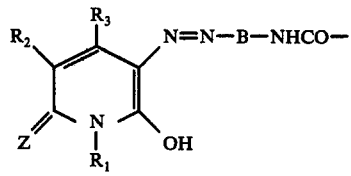

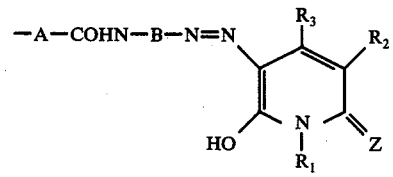

wherein A denotes a direct bond or an aliphatic, cycloaliphatic, aromatic or heterocyclic radical, B denotes an aromatic radical, $R_1$ denotes a H atom, an alkyl group which contains 1-4 C atoms and which is optionally substituted by a phenyl radical, or an aryl radical, $R_2$ denotes a H atom, an alkyl group containing 1-4 C atoms, a cyano or carbamoyl group, an alkoxycarbonyl or alkylcarbamoyl group containing 2-6 C atoms, or a phenyl, benzoyl or phenylcarbamoyl group which is optionally substituted in the phenyl radical by halogen atoms or alkyl or alkoxy groups containing 1-4 C atoms, $R_3$ denotes a H atom, an alkyl group containing 1-4 C atoms, a cycloalkyl group containing 5-6 C atoms, a cyano, hydroxyl or carbamoyl group, an alkoxycarbonyl or alkylcarbamoyl group containing 2-6 C atoms, or a phenyl or phenylcarbamoyl group which is optionally substituted by halogen atoms or alkyl or alkoxy groups containing 1-4 C atoms, and Z denotes an O atom or a N atom, and the N atom, conjointly with the radical $R_1$, forms a benzimidazole ring, which are useful for pigmenting high-molecular organic material.

8 Claims, No Drawings

DIAZOPIGMENTS CONTAINING PYRIDINE DERIVATIVES

The present invention relates to disazo pigments of the formula

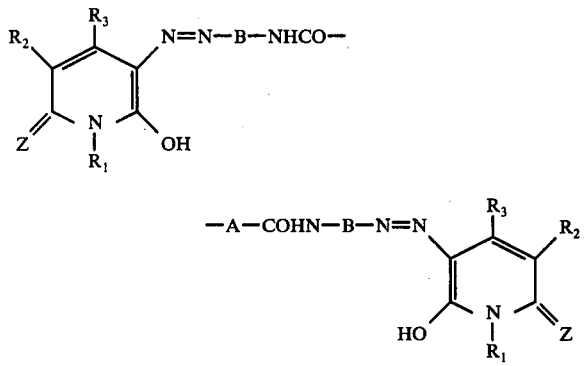

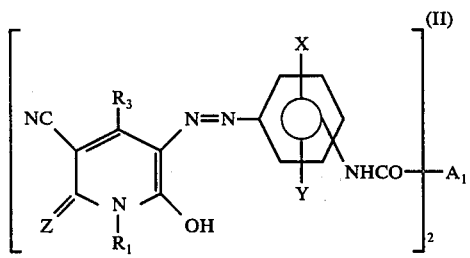

wherein A denotes a direct bond or an aliphatic, cycloaliphatic, aromatic or heterocyclic radical, B denotes and aromatic radical, $R_1$ denotes a H atom, and alkyl group which contains 1–4 C atoms and which is optionally substituted by a phenyl radical, or an aryl radical, particularly a phenyl radical which is optionally substituted by halogen atoms or alkyl or alkoxy groups containing 1 – 4 C atoms, $R_2$ denotes a H atom, an alkyl group containing 1 – 4 C atoms, a cyano or carbamoyl group, an alkoxycarbonyl or alkylcarbamoyl group containing 2–6 C atoms, or a phenyl, benzoyl or phenylcarbamoyl group which is optionally substituted in the phenyl radical by halogen atoms or alkyl or alkoxy groups containing 1–4 C atoms, $R_3$ denotes a H atom, an alkyl group containing 1–4 C atoms, a cycloalkyl group containing 5–6 C atoms, a cyano, hydroxyl or carbamoyl group, an alkoxycarbonyl or alkylcarbamoyl group containing 2–6 C atoms, or a phenyl or phenylcarbamoyl group which is optionally substituted by halogen atoms or alkyl or alkoxy groups containing 1–4 C atoms, and Z denotes an O atom or a N atom, the N atom forming, together with the radical $R_1$, a benzimidazole ring.

Pigments of particular interest are those of the formula

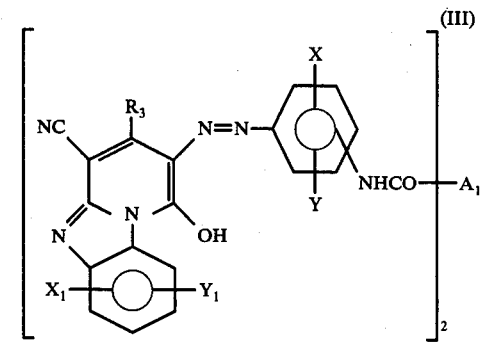

wherein $R_1$, $R_3$ and Z have the meaning indicated above, $A_1$ denotes a direct bond, an alkylene group containing 1–6 C atoms, or a phenylene group which is optionally substituted by halogen atoms or alkyl or alkoxy groups containing 1–4 C atoms, or a naphthylene, furanediyl or thiophenediyl group, and X and Y denote H or halogen atoms or alkyl or alkoxy groups containing 1–4 C atoms.

Preferred pigments are those of the formula (I), wherein Z denotes an O atom, and those of the formula

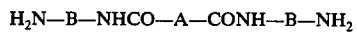

wherein $A_1$, $R_3$, X and Y have the meaning indicated, and $X_1$ and $Y_1$ denote H or halogen atoms, nitro or carbamoyl groups, alkyl, alkoxy or alkylsulphonyl groups containing 1–4 C atoms, alkoxycarbonyl, alkanoylamino or alkylcarbamoyl groups containing 2–6 C atoms or phenoxy or phenylcarbamoyl groups which are optionally substituted by halogen atoms or alkyl or alkoxy groups containing 1–4 C atoms.

The new disazo pigments are obtained if a. the tetrazo compound of a diamine of the formula $$H_2N-B-NHCO-A-CONH-B-NH_2$$

is coupled, in the molar ratio 1:2, with a dihydropyridine derivative of the formula

or b. an amine of the formula

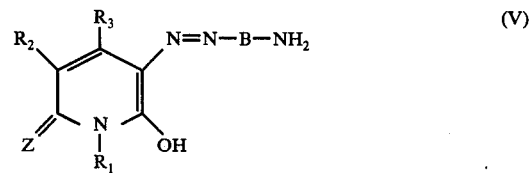

is condensed, in the molar ratio 2:1, with a halide of a dicarboxylic acid of the formula

HOOC-A-COOH (VI).

The diamines used are preferably those of the formula

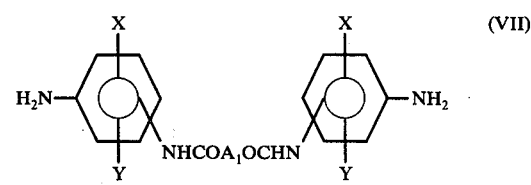

wherein $A_1$ denotes a direct bond, an alkylene group containing 1-6 C atoms or a phenylene group which is optionally substituted by halogen atoms or alkyl or alkoxy groups containing 1-4 C atoms, or a naphthylene, furane or thiophene group, and X and Y denote H or halogen atoms or alkyl or alkoxy groups containing 1-4 C atoms. Some of these are known compounds.

The diamines mentioned are obtained by condensing a dihalide of a dicarboxylic acid of the formula

HOOC—A—COOH            (VI)

wherein A has the abovementioned meaning, in the molar ratio of 1:2 with a nitroamine of the formula

$O_2N$—B—$NH_2$            (VII)

wherein B has the abovementioned meaning, and reducing the resulting dinitro compound to the diamine, or by condensing a dihalide, particularly a dichloride, of a dicarboxylic acid of the formula (VI), in the molar ratio of 1:2, with an amine of the formula B—$NH_2$, dinitrating the resulting dicarboxylic acid diarylamide and reducing the dinitro compound of the diamine.

The following may be mentioned as examples of dicarboxylic acids of the formula (VI): oxalic acid, malonic acid, maleic acid, fumaric acid, succinic acid, adipic acid, hexahydroterephthalic acid, terephthalic acid, isophthalic acid, 2,5-dichloroterephthalic acid, 2,5-dimethoxyterephthalic acid, 3,3'-azobenzenedicarboxylic acid, 4,4'-azobenzenedicarboxylic acid, 4,4''-azodiphenyldicarboxylic acid, naphthalene-2,6-dicarboxylic acid, naphthalene-2,7-dicarboxylic acid, fluoranthene-4,12-dicarboxylic acid, benzanthrone-2,6-dicarboxylic acid, anthraquinone-2,6-dicarboxylic acid, furane-2,5-dicarboxylic acid, thiophene-2,5-dicarboxylic acid, quinoline-5,7- or quinoline-5,8-dicarboxylic acid, and also dicarboxylic acids of the type

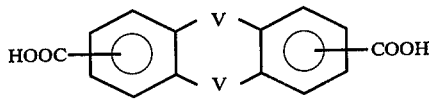

wherein V represents O, S, SO or $SO_2$, that is to say, for example, thianthrene-dicarboxylic acid or diphenyleneoxide-dicarboxylic acid.

The following may be mentioned as further examples of heterocyclic dicarboxylic acids: 2,5-diphenyl-1,3,4-oxdiazole-4',4''-dicarboxylic acid and 2,5-diphenyl-1,3,4-triazole-4',4''-dicarboxylic acid.

Nitroamines of the formula (VII) which should be mentioned are particularly those of the formula

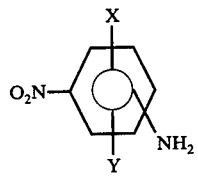

wherein X and Y have the meaning indicated above.

The following may be mentioned as examples: o-, m- or p-nitroaniline, 2-chloro-4-nitroaniline, 2chloro-5-nitroaniline, 4-chloro-2-nitroaniline, 4-chloro-3-nitroaniline, 2-bromo-4-nitroaniline, 2,5-dichloro-4-nitroaniline, 2,6-dichloro-4-nitroaniline, 2,5-dibromo-4-nitroaniline, 2-methyl-4-nitroaniline, 2-methoxy-4-nitroaniline, 2-methyl-5-chloro-4-nitroaniline, 2-methoxy-5-chloro-4-nitroaniline, 2,5-dimethyl-4-nitroaniline, 2-methyl-5-methoxy-4-nitroaniline, 2,5-dimethoxy-4-nitroaniline, 2,5-diethoxy-4-nitroaniline, 2-cyano-4-nitroaniline and 2-trifluoromethyl-4-nitroaniline.

The following may be mentioned as examples of amines of the formula B-$NH_2$: 3-methylaniline, 3-methoxyaniline, 4-methoxyaniline, 4-ethoxyaniline, 2-chloro-5-methoxyaniline, 2-chloro-5-ethoxyaniline, 2,4-dimethylaniline, 2,4-dimethoxyaniline, 2,5-diethoxyaniline, 2-chloro-5-methoxyaniline, 2-methyl-5-methoxyaniline, 2-aminophenylmethylsulphone and 2-aminophenylethylsulphone.

The coupling components preferably correspond to the formula

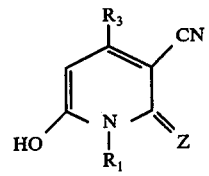

wherein $R_1$, $R_3$ and Z have the meaning indicated.

Pyridine derivatives of particular interest are those of the formulae

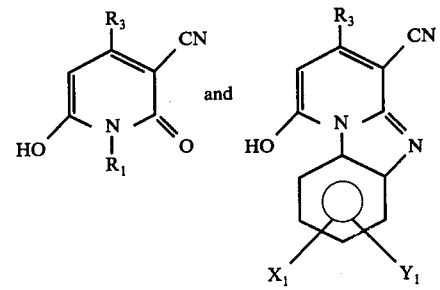

wherein $R_1$ and $R_3$ have the meaning indicated and preferably denote a methyl or phenyl group, and $X_1$ and $Y_1$ denote H or halogen atoms, nitro or carbamoyl groups, alkyl, alkoxy or alkylsulphonyl groups containing 1-4 C atoms, alkoxycarbonyl, alkanoylamino or alkylcarbamoyl groups containing 2-6 C atoms, or phenoxy or phenylcarbamoyl groups which are optionally substituted by halogen atoms or alkyl or alkoxy groups containing 1-4 C atoms.

The abovementioned pyridones are known compounds.

The following may be mentioned as examples: 1,6-dihydroxy-3-cyano-4-methylpyridine, 1-methyl-3-cyano-4-methyl-6-hydroxypyrid-2-one, 1-ethyl-3-cyano-4-methyl-6-hydroxypyrid-2-one, 1-phenyl-3-cyano-4-methyl-6-hydroxypyrid-2-one, 1-p-tolyl-3-cyano-4-methyl-6-hydroxypyrid-2-one, 1-p-anisyl-3-cyano-4-methyl-6-hydroxypyrid-2-one, 1-phenyl-3-cyano-4-phenyl-6-hydroxypyrid-6-one, 1-p-tolyl-3-cyano-4-phenyl-6-hydroxypyrid-2-one, 1-p-anisyl-3-cyano-4-phenyl-6-hydroxypyrid-2-one, 1-phenyl-3-carbonamido-4-methyl-6-hydroxypyrid-2-one, 1-phenyl-3-carbonamido-4-phenyl-6-hydroxypyrid-2-one, 1-phenyl-3-ethoxycarbonyl-4-methyl-6-hydroxypyrid-2-one, 1-phenyl-3-ethoxycarbonyl-4-phenyl-6-hydroxypyrid-2-one, 2,6-dihydroxy-3-carbamoyl-4-methylpyridine, 2,6-dihydroxy-3-ethoxycarbonyl-4-methylpyridine, 2,6- dihydroxy-3-diethylcarbamoyl-4-methylpyridine, 2,6-dihydroxy-3-carbamoylpyridine, 2,6-dihydroxy-3-carbamoyl-4-phenylpyridine, 2,6-dihydroxy-3-ethoxycarbonyl-4-phenylpyridine, 2,6-dihydroxy-3-cyano-4-ethoxycarbonylpyridine, 2,6-dihydroxy-3-cyano-4-carbamoylpyridine, 2,6-dihydroxy-3-cyano-pyridyl-4-acetate, 2,6-dihydroxy-3-cyano-pyridyl-4-acetamide, 2,6-dihydroxy-3-cyanopyridyl-4-acetodiethylamide, 2,6-dihydroxy-3,4-diethoxycarbonyl-pyridine, 2,6-dihydroxy-3-carbamoyl-4-ethoxycarbonyl-pyridine, 2,6-dihydroxy-3,4-di-(carbamoyl)-pyridine, 2,6-dihydroxypyridine, 2,6-dihydroxy-4-methylpyridine, 2,6-dihydroxy-isonicotinamide, 2,6-dihydroxy-isonicotinic acid diethylamide, 2,6-dihydroxy-4-cyanopyridine, 2,6-dihydroxy-4-phenylpyridine, 2,6-dihydroxy-4-(p-methoxyphenyl)-pyridine, 4-methyl-2,6-dihydroxypyridine, 1-ethyl-3,4-dimethyl-6-hydroxypyrid-2-one, 1-methyl-5-carbonamido-3,4-tetramethylene-6-hydroxypyrid-2-one and 4-methyl-3-(4'-methylphenylsulphonyl)-amino-2,6-dihydroxypyridine.

The benzimidazolopyridines are appropriately obtained by known processes by condensing a benzimidazole of the formula

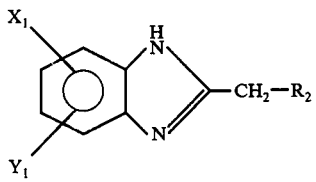

wherein $R_2$, $X_1$ and $Y_1$ have the meaning indicated, with an acylacetic ester of the formula

wherein R denotes an alkyl group containing 1 - 4 C atoms, and $R_3$ has the meaning indicated.

The following may be mentioned as examples of acylacetic esters: acetoacetic acid methyl ester, acetoacetic acid ethyl ester, benzoylacetic acid ethyl ester and oxalacetic acid diethylester.

The following may be mentioned as benzimidazoles: 2-cyanomethyl-benzimidazole, 2-cyanomethyl-4-chloro-benzimidazole, 2-cyanomethyl-5-chloro-benzimidazole, 2-cyanomethyl-5,6-dichloro-benzimidazole, 2-cyanomethyl-4-chloro-6-methyl-benzimidazole, 2-cyanomethyl-5-methoxy-benzimidazole, 2-cyanomethyl-6-ethoxy-benzimidazole, 2-cyanomethyl-6-nitrobenzimidazole, 2-cyanomethyl-5-methylsulphonyl-benzimidazole, benzimidazolyl-2-acetic acid amide, benzimidazolyl-2-acetic acid methylamide, benzimidazolyl-2-acetic acid phenylamide, benzimidazolyl-2-acetic acid methyl ester, benzimidazolyl-2-acetic acid ethyl ester, benzimidazolyl-2-acetic acid phenyl ester, 2-ethyl-benzimidazole, 2-benzyl-benzimidazole and 2-cyanomethyl-6-trifluoromethyl-benzimidazole.

The coupling is appropriately carried out by adding the tetrazonium solution gradually to an aqueous or organic solution of the coupling component at a pH value of 4 - 8. The pH value is advantageously adjusted by adding a buffer. Examples of buffers which can be used are the salts, particularly alkali metal salts, of formic acid, acetic acid or phosphoric acid as well as tertiary nitrogen bases, such as pyridine, trimethylamine, triethylamine or triethanolamine. Furthermore, it is possible to add to the coupling solution wetting agents, dispersing agents or emulsifiers, for example an aralkyl-sulphonate, such as dodecylbenzenesulphonate, polycondensation products of ethylene oxides, such as the product from the reaction of ethylene oxide with p-tert.-octylphenol, and also alkyl esters of sulphoricinoleates, for example n-butyl sulphoricinoleate. The coupling dispersion can also contain protective colloids, for example methylcellulose or minor amounts of an inert organic solvent which is sparingly soluble or insoluble in water, for example halogenated or nitrated aromatic hydrocarbons, such as benzene, toluene, xylene, chlorobenzene, dichlorobenzene or nitrobenzene, and aliphatic halogenohydrocarbons, such as carbon tetrachloride or trichloroethylene, and also organic solvents which are miscible with water, such as acetone, methanol, ethanol, isopropanol, methyl ethyl ketone and dimethylformamide.

By virtue of their insolubility, the resulting pigments can be isolated from the reaction mixtures by filtration. As a rule an after-treatment in an organic solvent, preferably boiling above 100° C, proves advantageous in order to obtain an excellent texture in these pigments. Solvents which prove particularly suitable are benzene derivatives which are substituted by halogen atoms or alkyl or nitro groups, such as xylene, chlorobenzene, o-dichlorobenzene or nitrobenzene, and pyridine bases, such as pyridine, picoline or quinoline, and also ketones, such as cyclohexanone, ethers, such as ethylene glycol monomethyl ether or ethylene glycol monoethyl ether, amides, such as dimethylformamide, dimethylacetamide or N-methylpyrrolidone, and sulphoxane. The after-treatment is preferably carried out by heating the dried pigment in the solvent at 100° - 150° C, during which a homogeneous crystal structure is formed and, in many cases, a coarsening of the particles occurs, which has a favourable effect on the rheological behaviour and on the fastness to migration and light of the resulting pigments.

The coupling can also be advantageously carried out by adding an acid solution of the tetrazonium salt slowly to an organic solution, buffered with a tertiary base, of the coupling component. Solvents which are miscible with water, such as dimethylformamide, dimethylacetamide, N-methylpyrrolidone and dimethylsulphoxide or sulphoxone, are, in particular, suitable for use as the organic solvents. This method offers the advantage that, after the coupling is completed, water and readily volatile solvents which have been added with the tetrazo component, can be distilled off and the after-treatment can be carried out in the coupling suspension.

The coupling can also be carried out by continuously combining an acid solution of the tetrazonium salt with an alkaline solution of the coupling component in a mixing jet, an immediate coupling of the components taking place. The resulting colorant suspension is continuously withdrawn from the mixing jet and the colorant is removed by filtration.

It is also possible to use the corresponding tetrazoamino compounds instead of the tetrazonium salts. The former are obtained in accordance with a known process by coupling an aryltetrazonium salt with 2 mols of a primary or, preferably, a secondary amine. The most diverse amines, for example aliphatic amines, such as methylamine, ethylamine, ethanolamine, propylamine, butylamine, hexylamine and particularly dimethylamine, diethylamine, diethanolamine, methylethanolamine, dipropylamine or dibutylamine, aminoacetic acid, methylaminoacetic acid, butylaminoacetic acid, aminoethanesulphonic acid, methylaminoethanesulphonic acid, guanylethanesulphonic acid and β-aminoethylsulphuric acid, alicyclic amines, such as cyclohexylamine, N-methylcyclohexylamine and dicyclohexylamine, aromatic amines, such as 4-aminobenzoic acid, sulphanilic acid, 4-sulpho-2-aminobenzoic acid, (4-sulphophenyl)-guanidine, 4-N-methylaminobenzoic acid, 4-ethylaminobenzoic acid, 1-aminonaphthalene-4-sulphonic acid and 1-aminonaphthalene-2,4-disulphonic acid, heterocyclic amines, such as piperidine, morpholine, pyrrolidine or dihydroindole, and, finally, also sodium cyanamide or dicyandiamide are suitable for this purpose.

As a rule the resulting tetrazoamino compounds are sparingly soluble in cold water and can, if appropriate, be isolated from the reaction medium in a crystalline form after salting-out. In many cases the moist press cakes can be used for the subsequent reaction. In some cases, it can prove appropriate to dehydrate the tetrazoamides prior to the reaction by vacuum drying.

The coupling of the tetrazoamino compound with the coupling component is carried out in an organic solvent, for example chlorobenzene, o-dichlorobenzene, nitrobenzene, pyridine, ethylene glycol, ethylene glycol monoethyl or monomethyl ether, dimethylformamide, formic acid or acetic acid. When using solvents which are miscible with water, it is not necessary to use the tetrazoamino compounds in an anhydrous form. It is possible, for example, to use the water-moist filter cakes.

The coupling is appropriately carried out under warm conditions, preferably at temperatures between 80° and 180° C, and in an acid medium, and generally proceeds very rapidly and completely. If neutral solvents are used, it is advantageous to add an acid, for example hydrogen chloride, sulphuric acid, formic acid or acetic acid. By virtue of their insolubility, the resulting pigments can be isolated from the reaction mixture by filtration. An after-treatment with organic solvents, such as is required in the case of pigments which are obtained by the aqueous coupling route, is therefore unnecessary in most cases.

Finally, the coupling can also be accomplished by suspending the diamine which is to be tetrazotised in an organic solvent, together with the coupling component, in a molar ratio of 1:2, and by treating it with a diazotising agent, in particular an ester of nitrous acid, such as methyl, ethyl, butyl, amyl or octylnitrite, or with nitrosylsulphuric acid or with nitrosyl chloride.

The aminoazo compounds to be used for process variant b) are obtained by coupling a nitroamine of the formula (VII) with a dihydropyridine derivative of the formula (IV) and subsequently reducing the nitro group to give the amine.

The new colorants are valuable pigments which can be used in a finely divided form for pigmenting high-molecular organic material, for example cellulose ethers and esters, such as ethylcellulose, nitrocellulose, cellulose acetate and cellulose butyrate, natural resins or synthetic resins, such as polymerisation resins or condensation resins, for example aminoplasts, particularly urea-formaldehyde and melamine-formaldehyde resins, alkyd resins, phenoplasts, polycarbonates, polyolefines, such as polystyrene, polyvinyl chloride, polyethylene, polypropylene, polyacrylonitrile or polyacrylic acid esters, polyamides, polyurethanes or polyesters, rubber, casein, silicone and silicone resins, on their own or as mixtures.

It is immaterial here whether the high-molecular compounds mentioned are present as plastic compositions or melts or are present in the form of spinning solutions, lacquers or paints. Depending on the application, it proves advantageous to use the new pigments as toners or as preparations.

By virtue of their high tinctorial strength and transparency, the new colorants are particularly suitable for use in printing inks, such as letterpress printing, gravure printing and offset printing.

Compared with the colorants described in CH—PS 309,180, the pigments according to the invention are distinguished by particularly high tinctorial strength and better transparency in printing inks, and, compared with those of DAS 1,544,372, are distinguished by better resistance to light and migration.

EXAMPLE 1

2.04 parts of 2,2′,5,5′-tetrachloro-4,4′-diaminooxalylanilide are stirred with 3 parts of 10 N hydrochloric acid in 40 parts of acetic acid and are tetrazotised at 0°–5° C with 2.5 parts of 4 N sodium nitrite solution. The tetrazonium solution is clarified by filtration and is added dropwise over the course of 1 hour, whilst stirring well, to a solution of 2.45 parts of 3-cyano-4-methyl-1,2-(1′,2′)-benz-(4′,5′)-imidazolo-6-hydroxypyridine in 200 parts of dimethylformamide, 1 part of 30% strength sodium hydroxide solution in 25 parts of ethyl alcohol and 12.5 parts of pyridine. After the dropwise addition is complete, the diazo compound can no longer be detected. The mixture is now warmed in an oil bath to 130° – 150° C and water and acetic acid are distilled off until the internal temperature has reached 145° C. At the end of this time the product exhibits a homogeneous crystalline structure under the microscope. The mixture is allowed to cool to 100° C and is filtered and the material on the filter is washed with dimethylformamide warmed to 100° C until the filtrate issues virtually colourless. The product is then washed with methanol and finally with water. After drying in vacuo, a soft-grained pigment is obtained, which colours plastics and lacuqers in deep red shades of very good fastness to migration and overlaquering and good fastness to light.

This pigment corresponds to the formula

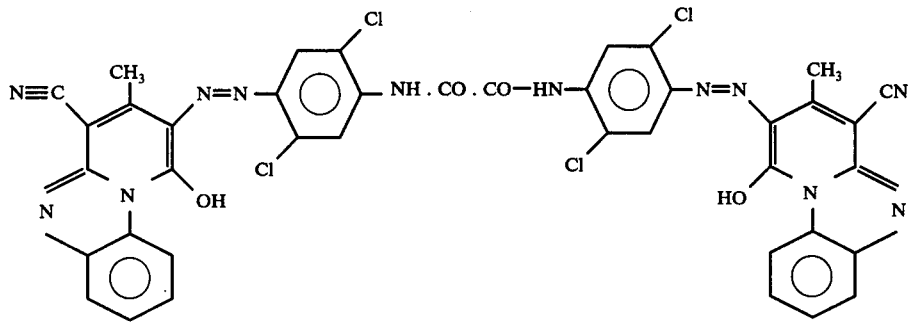

The Table which follows lists further colorants which are obtained if the diamines listed in column I are tetrazotised in accordance with the instructions of Example 1 and coupled with the coupling components listed in column II. Column III indicates the shade of a 0.2% strength coloration achieved with the colorant in PVC.

| | I | | | | | II | | | | III |
|---|---|---|---|---|---|---|---|---|---|---|
| No. | A | 2 | 3 | 4 | 5 | 6 | $R_1$ | $R_2$ | $R_3$ | Z | Shade |
| 2 | — | H | Cl | —NH$_2$ | Cl | H | H | —CN$_3$ | —CH$_3$ | =O | yellow |
| 3 | — | H | —Cl | —NH$_2$ | Cl | H | CH$_3$ | —CN$_3$ | —CH$_3$ | =O | reddish-tinged yellow |
| 4 | — | H | —Cl | —NH$_2$ | Cl | H | —C$_2$H$_5$ | —CN | —CH$_3$ | =O | reddish-tinged yellow |
| 5 | — | H | —Cl | —NH$_2$ | Cl | H | —C$_2$H$_5$ | —CONH$_2$ | —CH$_3$ | =O | orange |
| 6 | — | H | —Cl | —NH$_2$ | Cl | H | phenyl | —CN | —CH$_3$ | =O | orange |
| 7 | — | H | —Cl | —NH$_2$ | Cl | H | o-tolyl | —CN | phenyl | —N= | bluish-tinged red |
| 8 | — | H | —Cl | —NH$_2$ | —Cl | H | o-tolyl | —CN | —COOC$_2$H$_5$ | —N= | bluish-tinged red |
| 9 | p-tolyl | CH$_3$ | H | —NH$_2$ | H | H | H | —CN | —CH$_3$ | =O | yellowish-tinged red |
| 10 | p-tolyl | CH$_3$ | H | —NH$_2$ | H | H | o-tolyl | —CN | —CH$_3$ | —N= | bluish-tinged red |
| 11 | p-tolyl | CH$_3$ | H | —NH$_2$ | H | H | o-tolyl | —CN | phenyl | —N= | claret |
| 12 | p-tolyl | —OCH$_3$ | H | —NH$_2$ | —OCH$_3$ | H | o-tolyl | —CN | —CH$_3$ | —N= | blue |

-continued

| No. | A | 2 | 3 | 4 | 5 | 6 | R₁ | R₂ | R₃ | Z | Shade |
|---|---|---|---|---|---|---|---|---|---|---|---|
| 13 | phenyl | —OCH₃ | H | —NH₂ | —OCH₃ | H | 2-methylphenyl | —NC | —COOC₂H₅ | —N= | blue |
| 14 | thienyl | —OCH₃ | H | —NH₂ | —OCH₃ | H | 2-methylphenyl | —NC | —CH₃ | —N= | blue |
| 15 | thienyl | —OCH₃ | H | —NH₂ | —OCH₃ | H | H | —NC | —CH₃ | =O | violet |
| 16 | thienyl | H | H | —NH₂ | H | H | 2-methylphenyl | CN | CH₃ | —N= | red |
| 17 | thienyl | H | H | —NH₂ | H | H | —C₂H₅ | CN | CH₃ | =O | orange |
| 18 | thienyl | H | H | —NH₂ | H | H | —H | CN | CH₃ | =O | orange |
| 19 | thienyl | H | H | —NH₂ | H | H | 2,6-dimethylphenyl | CN | phenyl | =N— | violet |
| 20 | thienyl | H | H | —NH₂ | H | H | —C₂H₅ | —CONH₂ | CH₃ | =O | red |
| 21 | thienyl | Cl | H | —NH₂ | H | H | 2-methylphenyl | —CN | CH₃ | =N— | red |
| 22 | thienyl | —Cl | H | —NH₂ | H | H | 2,6-dimethylphenyl | —CN | phenyl | =N— | blue-red |

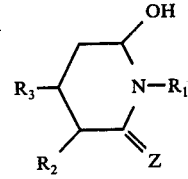

| No. | A | 2 | 3 | 4 | 5 | 6 | R₁ | R₂ | R₃ | Z | Shade |
|---|---|---|---|---|---|---|---|---|---|---|---|
| 23 | thienyl | —Cl | H | —NH₂ | H | H | —C₂H₅ | —CN | —CH₃ | =O | orange |
| 24 | thienyl | —Cl | H | —NH₂ | H | H | H | —CN | —CH₃ | =O | orange |
| 25 | thienyl | H | —NH₂ | H | H | H | 2-methylphenyl | —CN | —CH₃ | =N— | red |
| 26 | thienyl | H | —NH₂ | H | H | H | 2,6-dimethylphenyl | —CN | phenyl | =N— | red |
| 27 | thienyl | H | —NH₂ | H | H | H | —C₂H₅ | —CN | —CH₃ | =O | orange |

-continued

| No. | A | 2 | 3 | 4 | 5 | 6 | R₁ | R₂ | R₃ | Z | Shade |
|---|---|---|---|---|---|---|---|---|---|---|---|
| 28 | (thiophene) | H | —NH₂ | H | H | H | | —CN | —CH₃ | =O | orange |
| 29 | (furan) | H | H | —NH₂ | H | H | (tolyl) | —CN | —CH₃ | =N— | claret |
| 30 | (furan) | H | H | —NH₂ | H | | (tolyl) | —CN | (phenyl) | =N— | claret |
| 31 | (phenyl) | —CH₃ | H | —NH₂ | H | H | (tolyl) | —CN | —CH₃ | =N— | red |
| 32 | (phenyl) | —CH₃ | H | —NH₂ | H | H | (tolyl) | —CN | | =N— | red |
| 33 | (phenyl) | —CH₃ | H | —NH₂ | H | H | —C₂H₅ | —CN | —CH₃ | =O | orange |
| 34 | (phenyl) | —CH₃ | H | —NH₂ | H | H | —H | —CN | —CH₃ | =O | orange |
| 35 | (phenyl) | Cl | H | —NH₂ | H | | (tolyl) | H | CH₃ | =N— | |

EXAMPLE 36

65 parts of stabilised polyvinyl chloride, 35 parts of dioctyl phthalate and 0.2 part of the colorant obtained in accordance with Example 1 are stirred together and the mixture is worked for 7 minutes at 140° C on a twin-roll calendar. This gives a pure, red-coloured sheet with very good fastness to light and migration.

EXAMPLE 37

1.00 g of the pigment prepared in accordance with Example 1 is finely ground on an Engelsmann grinding machine with 4.00 g of lithographic varnish of the following composition:
29.4% of linseed oil stand oil (300 poises),
67.2% of linseed oil stand oil (20 poises),
2.1% of cobalt acetate and
1.3% of lead acetate
and is then printed at 1 g/m² on art printing paper with the aid of a block in the letterpress process. A deep, pure and brilliant red shade of very good transparency is obtained.

The pigment is also suitable for other printing processes, such as gravure printing, offset printing and flexographic printing and gives excellent results in these applications too.

EXAMPLE 38

10 parts of titanium dioxide and 2 parts of the colorant prepared in accordance with Example 1 are ground for 48 hours in a ball mill together with 88 parts of a mixture of 26.4 parts of coconut alkyl resin, 24.0 parts of melamine-formaldehyde resin (50% solids content), 8.8 parts of ethylene glycol monomethyl ether and 28.8 parts of xylene.

If this lacquer is sprayed onto an aluminium foil, dried at room temperature for 30 minutes and then stoved for 30 minutes at 120° C, a brilliant, red lacquering which has good gloss and which is distinguished by very good resistance to overlacquering, light and weathering, is obtained.

8. Disazopigment of the formula
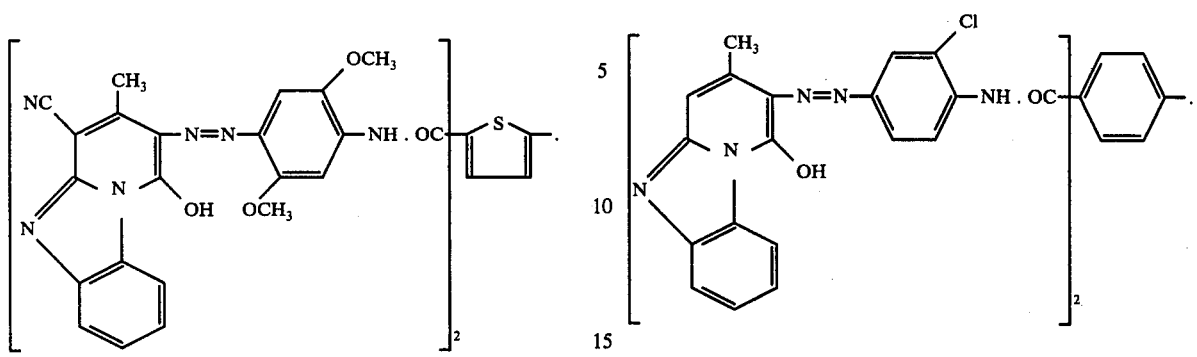

I claim:

1. A diazopigment of the formula

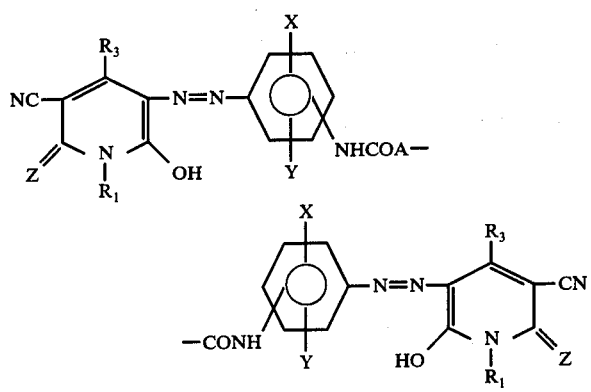

wherein A denotes a direct bond; alkylene containing 1 to 6 carbon atoms; phenylene; phenylene substituted by halogen, alkyl containing 1 to 4 carbon atoms, or alkoxy containing 1 to 4 carbon atoms; naphthalene; furanediyl; or thiophenediyl; X and Y denote hydrogen; halogen; alkyl containing 1 to 4 carbon atoms; or alkoxy containing 1 to 4 carbon atoms; $R_1$ denotes hydrogen; alkyl containing 1 to 4 carbon atoms; alkyl containing 1 to 4 carbon atoms substituted by phenyl; phenyl; phenyl substituted by halogen, alkyl containing 1 to 4 carbon atoms, or alkoxy containing 1 to 4 carbon atoms; $R_3$ denotes hydrogen; alkyl containing 1 to 4 carbon atoms; cycloalkyl containing 5 to 6 carbon atoms; cyano; hydroxyl; carbamoyl; alkoxycarbonyl containing 2 to 6 carbon atoms; alkylcarbamoyl containing 2 to 6 carbon atoms; phenyl; phenyl substituted by halogen, alkyl containing 1 to 4 carbon atoms, or alkoxy containing 1 to 4 carbon atoms; phenylcarbamoyl; or phenylcarbamoyl substituted by halogen, alkyl containing 1 to 4 carbon atoms, or alkoxy containing 1 to 4 carbon atoms; and Z denotes oxygen; or nitrogen which, conjointly with the radical $R_1$, forms a benzimidazole ring.

2. A diazpigment of the formula

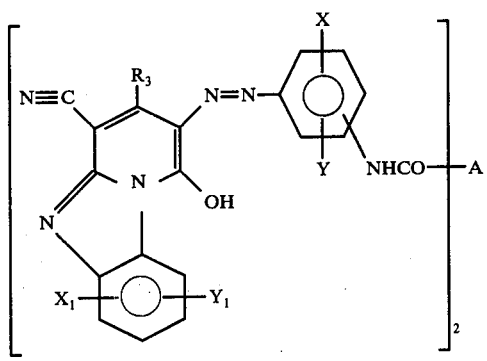

wherein A denotes a direct bond; alkylene containing 1 to 6 carbon atoms; phenylene; phenylene substituted by halogen, alkyl containing 1 to 4 carbon atoms, or alkoxy containing 1 to 4 carbon atoms; naphthalene; furanediyl; or thiophenediyl; $R_3$ denotes hydrogen; alkyl containing 1 to 4 carbon atoms; cycloalkyl containing 5 to 6 carbon atoms; cyano; hydroxyl; carbamoyl; alkoxycarbonyl containing 2 to 6 carbon atoms; alkylcarbamoyl containing 2 to 6 carbon atoms; phenyl; phenyl substituted by halogen, alkyl containing 1 to 4 carbon atoms, or alkoxy containing 1 to 4 carbon atoms; phenylcarbamoyl; or phenylcarbamoyl substituted by halogen, alkyl containing 1 to 4 carbon atoms, or alkoxy containing 1 to 4 carbon atoms; X and Y denote hydrogen; halogen; alkyl containing 1 to 4 carbon atoms; or alkoxy containing 1 to 4 carbon atoms; and $X_1$ and $Y_1$ denote hydrogen; halogen; nitro; carbamoyl; alkyl containing 1 to 4 carbon atoms; alkoxy containing 1 to 4 carbon atoms; alkylsulphonyl containing 1 to 4 carbon atoms; alkoxycarbonyl containing 2 to 6 carbon atoms; alkanoylamino containing 2 to 6 carbon atoms; alkylcarbamoyl containing 2 to 6 carbon atoms; phenoxy; phenoxy substituted by halogen, alkyl containing 1 to 4 carbon atoms or alkoxy containing 1 to 4 carbon atoms; phenylcarbamoyl; or phenylcarbamoyl substituted by halogen, alkyl containing 1 to 4 carbon atoms, or alkoxy containing 1 to 4 carbon atoms.

3. The disazo pigment according to claim 1 wherein Z denotes oxygen.

4. Disazopigment according to claim 1 of the formula

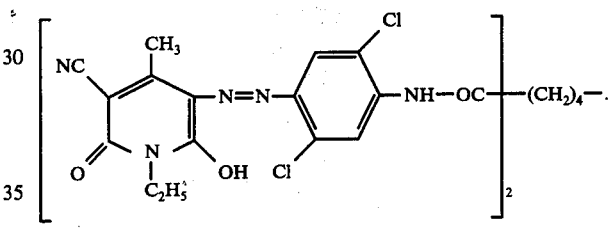

5. Disazopigment according to claim 1 of the formula

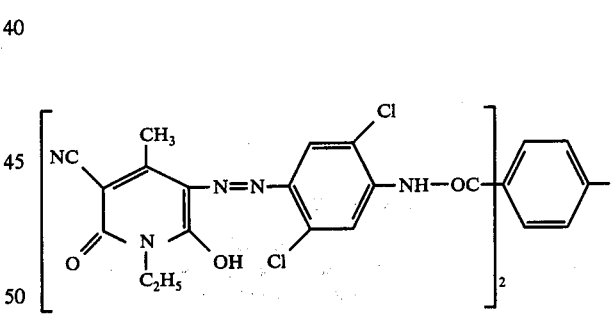

6. Disazopigment according to claim 1 of the formula

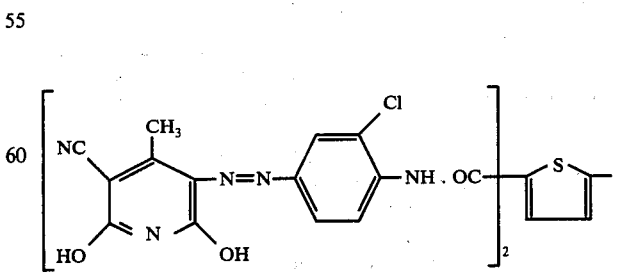

7. Disazopigment according to claim 1 of the formula